US012793716B2

(12) United States Patent
Shastry et al.

(10) Patent No.: US 12,793,716 B2
(45) **Date of Patent: *Nov. 10, 2026**

(54) COMPUTER SYSTEMS EXHIBITING IMPROVED COMPUTER SPEED AND TRANSCRIPTION ACCURACY OF AUTOMATIC SPEECH TRANSCRIPTION (AST) BASED ON A MULTIPLE SPEECH-TO-TEXT ENGINES AND METHODS OF USE THEREOF

(71) Applicant: VOXSMART LIMITED, London (GB)

(72) Inventors: Tejas Shastry, Chicago, IL (US); Matthew Goldey, Chicago, IL (US); Svyat Vergun, Morton Grove, IL (US)

(73) Assignee: VOXSMART LIMITED, London (GB)

( * ) Notice: Subject to any disclaimer, the term of this patent is extended or adjusted under 35 U.S.C. 154(b) by 39 days.

This patent is subject to a terminal disclaimer.

(21) Appl. No.: 18/989,038

(22) Filed: Dec. 20, 2024

(65) Prior Publication Data

US 2025/0119553 A1 Apr. 10, 2025

Related U.S. Application Data

(63) Continuation of application No. 18/060,351, filed on Nov. 30, 2022, now Pat. No. 12,219,154, which is a (Continued)

(51) Int. Cl.
*G10L 15/26* (2006.01)
*G10L 15/00* (2013.01)
(Continued)

(52) U.S. Cl.
CPC .............. *G10L 15/26* (2013.01); *G10L 15/04* (2013.01); *G10L 15/22* (2013.01); *G10L 17/00* (2013.01);
(Continued)

(58) Field of Classification Search
CPC ......... G10L 15/26; G10L 15/04; G10L 15/22; G10L 17/00; G10L 25/78; G10L 15/005;
(Continued)

(56) References Cited

U.S. PATENT DOCUMENTS 7,440,895 B1 10/2008 Miller et al.
7,505,905 B1 3/2009 Zimmerman et al.
(Continued)

*Primary Examiner* — Philip H Lam
(74) *Attorney, Agent, or Firm* — PIERSON FERDINAND LLP; Keats Quinalty

(57) ABSTRACT

In some embodiments, an exemplary inventive system for improving computer speed and accuracy of automatic speech transcription includes at least components of: a computer processor configured to perform: generating a recognition model specification for a plurality of distinct speech-to-text transcription engines; where each distinct speech-to-text transcription engine corresponds to a respective distinct speech recognition model; receiving at least one audio recording representing a speech of a person; segmenting the audio recording into a plurality of audio segments; determining a respective distinct speech-to-text transcription engine to transcribe a respective audio segment; receiving, from the respective transcription engine, a hypothesis for the respective audio segment; accepting the hypothesis to remove a need to submit the respective audio segment to another distinct speech-to-text transcription engine, resulting in the improved computer speed and the accuracy of automatic speech transcription and generating a transcript of the audio recording from respective accepted hypotheses for the plurality of audio segments.

17 Claims, 5 Drawing Sheets

Related U.S. Application Data continuation of application No. 17/153,575, filed on Jan. 20, 2021, now Pat. No. 11,545,152, which is a continuation of application No. 16/208,291, filed on Dec. 3, 2018, now Pat. No. 10,930,287, which is a continuation of application No. 15/993,040, filed on May 30, 2018, now Pat. No. 10,147,428.

(51) Int. Cl.

| | |
|---|---|
| ***G10L 15/01*** | (2013.01) |
| ***G10L 15/04*** | (2013.01) |
| ***G10L 15/06*** | (2013.01) |
| ***G10L 15/14*** | (2006.01) |
| ***G10L 15/16*** | (2006.01) |
| ***G10L 15/22*** | (2006.01) |
| ***G10L 15/32*** | (2013.01) |
| ***G10L 17/00*** | (2013.01) |
| ***G10L 25/51*** | (2013.01) |
| ***G10L 25/78*** | (2013.01) |
| ***H04N 19/159*** | (2014.01) |
| ***H04N 19/172*** | (2014.01) |
| ***H04N 19/184*** | (2014.01) |
| ***H04N 19/187*** | (2014.01) |
| ***H04N 19/30*** | (2014.01) |
| ***H04N 19/70*** | (2014.01) |

(52) U.S. Cl.

CPC ........... *G10L 25/78* (2013.01); *H04N 19/159* (2014.11); *H04N 19/172* (2014.11); *H04N 19/184* (2014.11); *H04N 19/187* (2014.11); *H04N 19/30* (2014.11); *H04N 19/70* (2014.11); *G10L 15/005* (2013.01); *G10L 15/01* (2013.01); *G10L 15/063* (2013.01); *G10L 15/142* (2013.01); *G10L 15/16* (2013.01); *G10L 15/32* (2013.01); *G10L 25/51* (2013.01)

(58) Field of Classification Search

CPC ..... G10L 15/01; G10L 15/063; G10L 15/142; G10L 15/16; G10L 15/32; G10L 25/51; H04N 19/159; H04N 19/172; H04N 19/184; H04N 19/187; H04N 19/30; H04N 19/70

See application file for complete search history.

(56) References Cited

U.S. PATENT DOCUMENTS

| | | | | |
|---|---|---|---|---|
| 7,917,364 | B2 | 3/2011 | Yacoub | |
| 8,041,565 | B1 | 10/2011 | Bhardway et al. | |
| 9,275,635 | B1 * | 3/2016 | Beaufays | G10L 15/32 |
| 2001/0016813 | A1 | 8/2001 | Brown et al. | |
| 2003/0182113 | A1 | 9/2003 | Huang | |
| 2004/0128135 | A1 | 7/2004 | Anastasakos et al. | |
| 2005/0065790 | A1 | 3/2005 | Yacoub | |
| 2005/0240404 | A1 | 10/2005 | Gurram et al. | |
| 2009/0138265 | A1 | 5/2009 | Willett et al. | |
| 2010/0057450 | A1 | 3/2010 | Koll | |
| 2010/0185447 | A1 | 7/2010 | Krumel et al. | |
| 2010/0250243 | A1 | 9/2010 | Schalk et al. | |
| 2011/0161077 | A1 | 6/2011 | Bielby | |
| 2012/0179471 | A1 | 7/2012 | Newman et al. | |
| 2013/0058471 | A1 | 3/2013 | Garcia | |
| 2013/0080146 | A1 | 3/2013 | Kato et al. | |
| 2013/0085753 | A1 | 4/2013 | Bringert et al. | |
| 2013/0132089 | A1 | 5/2013 | Fanty et al. | |
| 2013/0238336 | A1 | 9/2013 | Sung et al. | |
| 2014/0122075 | A1 | 5/2014 | Bak et al. | |
| 2014/0337032 | A1 | 11/2014 | Aleksic et al. | |
| 2014/0343940 | A1 | 11/2014 | Yassa | |
| 2015/0039317 | A1 | 2/2015 | Klein et al. | |
| 2015/0106085 | A1 | 4/2015 | Lindahl | |
| 2015/0364129 | A1 * | 12/2015 | Gonzalez-Dominguez | G10L 15/005 704/251 |
| 2018/0096678 | A1 | 4/2018 | Zhou et al. | |
| 2018/0096687 | A1 | 4/2018 | Cook et al. | |
| 2019/0341052 | A1 | 11/2019 | Allibhai | |

* cited by examiner

| Model | Content Type of Training Data | Audio Quality of Training Data |
|---|---|---|
| A | Specific | Low |
| B | General | Low |
| C | General | Medium |
| D | General | High |

COMPUTER SYSTEMS EXHIBITING IMPROVED COMPUTER SPEED AND TRANSCRIPTION ACCURACY OF AUTOMATIC SPEECH TRANSCRIPTION (AST) BASED ON A MULTIPLE SPEECH-TO-TEXT ENGINES AND METHODS OF USE THEREOF

CROSS REFERENCE TO RELATED APPLICATIONS

This application is a continuation of U.S. patent application Ser. No. 18/060,351, filed Nov. 30, 2022, which is a continuation of U.S. patent application Ser. No. 17/153,575, filed Jan. 20, 2021, now U.S. Pat. No. 11,545,152, which is a continuation of U.S. patent application Ser. No. 16/208,291, filed Dec. 3, 2018, now U.S. Pat. No. 10,930,287, which is a continuation of U.S. patent application Ser. No. 15/993,040, filed May 30, 2018, now U.S. Pat. No. 10,147,428. The aforementioned applications are hereby incorporated herein by reference in their entirety.

FIELD OF THE INVENTION

The present invention relates generally to computer systems exhibiting improved computer speed and transcription accuracy of automatic speech transcription based on a multiple speech-to-text engines and methods of use thereof.

BACKGROUND

Typically, an automatic (non-human) speech recognition/transcription (AST) converts speech to text via a single speech recognition model. Typically, such single speech recognition model only transcribes a single language using a single acoustic model and is based on trade-offs in accuracy between general and specific language patterns.

SUMMARY OF THE INVENTION

In some embodiments, the present invention provides for an exemplary inventive computer-implemented method for improving computer speed and accuracy of automatic speech transcription that includes at least the steps of: generating, by at least one processor, at least one speech recognition model specification for a plurality of distinct speech-to-text transcription engines; where each distinct speech-to-text transcription engine corresponds to a respective distinct speech recognition model; where, for each distinct speech-to-text transcription engine, the at least one speech recognition model specification at least identifies: i) a respective value for at least one pre-transcription evaluation parameter, and ii) a respective value for at least one post-transcription evaluation parameter; receiving, by the at least one processor, at least one audio recording representing at least one speech of at least one person; segmenting, by the at least one processor, the at least one audio recording into a plurality of audio segments; where in each audio segment corresponds to a respective single phrase of a respective single person that has been bounded by points of silence in the at least one audio recording; determining, by the at least one processor, based on the respective value of the at least one pre-transcription evaluation parameter of the respective distinct speech recognition model in the at least one speech recognition model specification, a respective distinct speech-to-text transcription engine from the plurality of distinct speech-to-text transcription engines to be utilized to transcribe a respective audio segment of the plurality of audio segments; submitting, by the at least one processor, the respective audio segment to the respective distinct speech-to-text transcription engine; receiving, by the at least one processor, from the respective distinct speech-to-text transcription engine, at least one hypothesis for the respective audio segment; accepting, by the at least one processor, the at least one hypothesis for the respective audio segment based on the respective value of the at least one post-transcription evaluation parameter of the respective distinct speech recognition model in the at least one speech recognition model specification to obtain a respective accepted hypothesis for the respective audio segment of the plurality of audio segments of the at least one audio recording; where the accepting of the at least one hypothesis for each respective audio segment as the respective accepted hypothesis for the respective audio segment removes a need to submit the respective audio segment to another distinct speech-to-text transcription engine from the plurality of distinct speech-to-text transcription engines resulting in the improved computer speed and the accuracy of automatic speech transcription; generating, by the at least one processor, at least one transcript of the at least one audio recording from respective accepted hypotheses for the plurality of audio segments; and outputting, by the at least one processor, the at least one transcript of the at least one audio recording.

In some embodiments, the generating of the at least one speech recognition model specification for the plurality of distinct speech-to-text transcription engines includes: receiving, by the at least one processor, at least one training audio recording and at least one truth transcript of the at least one training audio recording; segmenting, by the at least one processor, the at least one training audio recording into a plurality of training audio segments and the at least one truth transcript into a plurality of corresponding truth training segment transcripts; applying, by the at least one processor, at least one pre-transcription audio classifier to each training audio segment of the plurality of training audio segments to generate first metadata classifying each training audio segment based at least on: i) language, ii) audio quality, and iii) accent; applying, by the at least one processor, at least one text classifier to each corresponding truth training segment transcript of the plurality of corresponding truth training segment transcripts to generate second metadata classifying each corresponding truth training segment transcript based at least on at least one content category; combining, by the at least one processor, the plurality of training audio segments, the plurality of corresponding truth training segment transcripts, the first metadata, and the second metadata to form at least one benchmark set; testing, by the at least one processor, each distinct speech-to-text transcription engine of the plurality of distinct speech-to-text transcription engines based on the at least one benchmark set to form a plurality of model result sets; where each model result set corresponds to the respective distinct speech-to-text transcription engine; where each model result set includes: i) the at least one benchmark set, ii) at least one model-specific training hypothesis for each training audio segment, iii) at least one confidence value associated with the at least one model-specific training hypothesis, and iv) at least one word error rate (WER) associated with the at least one model-specific training hypothesis; determining, by the at least one processor, a respective set of transcription decisions for each distinct speech-to-text transcription engine of the plurality of distinct speech-to-text transcription engines, where the respective set of transcription decisions defines, for each distinct speech-to-text transcription engine, the value of the at least one pre-transcription evaluation parameter and the value of the at least one post-transcription evaluation parameter; and combining, by the at least one processor, each respective set of transcription decisions for each distinct speech-to-text transcription engine of the plurality of distinct speech-to-text transcription engines into the at least one speech recognition model specification for the plurality of distinct speech-to-text transcription engines.

In some embodiments, the at least one pre-transcription evaluation parameter is selected from the group of: i) the language, ii) the audio quality, and iii) the accent.

In some embodiments, the respective set of transcription decisions includes at least one of: i) a pre-transcription importance ranking of a plurality of pre-transcription evaluation parameters, and ii) a post-transcription importance ranking of a plurality of post-transcription evaluation parameters.

In some embodiments, the at least one post-transcription evaluation parameter is a confidence threshold.

In some embodiments, each segment of the plurality of audio segments lasts between 5 and 15 seconds.

In some embodiments, the at least one audio recording is real-time streamed audio of the at least one speech of the at least one person.

In some embodiments, the at least one audio recording includes at least two speeches of at least two people; where the generating the at least one transcript of the at least one audio recording further includes: generating a first transcript of a first speech of a first person, and generating a second transcript of a second speech of a second person; and where the outputting the at least one transcript of the at least one audio recording further includes: outputting the first transcript of the first speech of the first person, and outputting the second transcript of the second speech of the second person.

In some embodiments, the at least two speeches are in distinct languages.

In some embodiments, the respective distinct speech recognition model is selected from the group consisting of: i) a phoneme-based acoustic Gaussian mixture model, ii) a phoneme-based acoustic hidden Markov model, iii) a phoneme-based acoustic neural net model trained from forced phonetic alignments, iv) a phoneme-based acoustic neural net model trained without forced phonetic alignments, v) a character-based acoustic neural net model, vi) any of i-v models coupled with an n-gram language model, and vii) any of i-v models coupled with a generative, neural net language model.

In some embodiments, the present invention provides for an exemplary inventive system for improving computer speed and accuracy of automatic speech transcription that includes at least components of: at least one specialized computer, including: a non-transient computer memory, storing particular computer executable program code; and at least one computer processor which, when executing the particular program code, is configured to perform at least the following operations: generating at least one speech recognition model specification for a plurality of distinct speech-to-text transcription engines; where each distinct speech-to-text transcription engine corresponds to a respective distinct speech recognition model; where, for each distinct speech-to-text transcription engine, the at least one speech recognition model specification at least identifies: i) a respective value for at least one pre-transcription evaluation parameter, and ii) a respective value for at least one post-transcription evaluation parameter; receiving at least one audio recording representing at least one speech of at least one person; segmenting the at least one audio recording into a plurality of audio segments; where in each audio segment corresponds to a respective single phrase of a respective single person that has been bounded by points of silence in the at least one audio recording; determining, based on the respective value of the at least one pre-transcription evaluation parameter of the respective distinct speech recognition model in the at least one speech recognition model specification, a respective distinct speech-to-text transcription engine from the plurality of distinct speech-to-text transcription engines to be utilized to transcribe a respective audio segment of the plurality of audio segments; submitting the respective audio segment to the respective distinct speech-to-text transcription engine; receiving, from the respective distinct speech-to-text transcription engine, at least one hypothesis for the respective audio segment; accepting the at least one hypothesis for the respective audio segment based on the respective value of the at least one post-transcription evaluation parameter of the respective distinct speech recognition model in the at least one speech recognition model specification to obtain a respective accepted hypothesis for the respective audio segment of the plurality of audio segments of the at least one audio recording; where the accepting of the at least one hypothesis for each respective audio segment as the respective accepted hypothesis for the respective audio segment removes a need to submit the respective audio segment to another distinct speech-to-text transcription engine from the plurality of distinct speech-to-text transcription engines resulting in the improved computer speed and the accuracy of automatic speech transcription; generating at least one transcript of the at least one audio recording from respective accepted hypotheses for the plurality of audio segments; and outputting the at least one transcript of the at least one audio recording.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

FIGS. 1-5B are representative of some exemplary aspects of the present invention in accordance with at least some principles of at least some embodiments of the present invention.

DETAILED DESCRIPTION OF EXEMPLARY EMBODIMENTS

Figure 1:
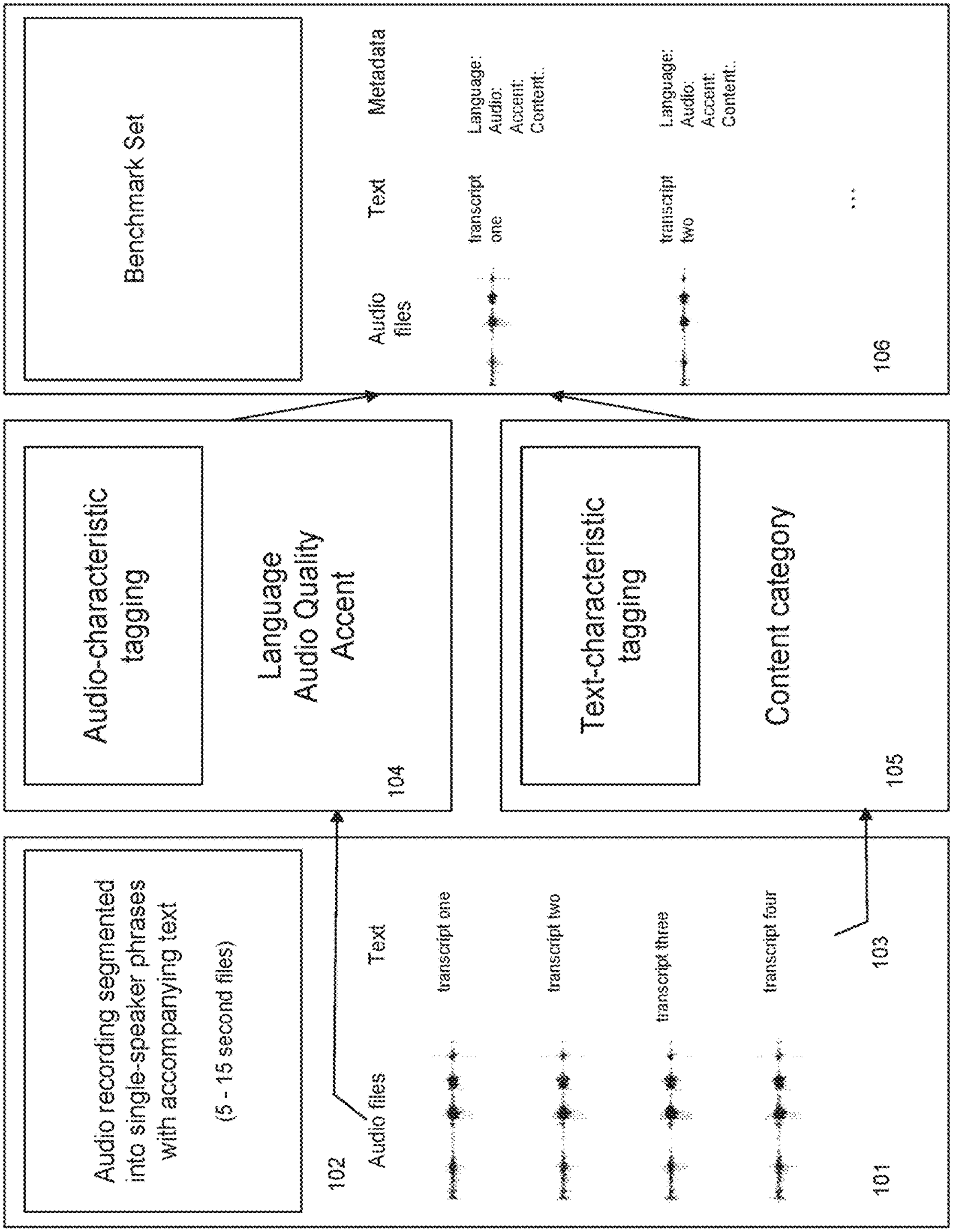

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Throughout the specification, the following terms take the meanings explicitly associated herein, unless the context clearly dictates otherwise. The phrases “in one embodiment”

and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred (e.g., less than 1 second difference between sequential events/actions).

As used herein, the term "dynamic(ly)" means that events and/or actions can be triggered and/or occur without any human intervention.

As used herein, the term "computer engine" identifies at least one software component and/or a combination of at least one software component and at least one hardware component which are designed/programmed/configured to manage/control other software and/or hardware components (such as the libraries, software development kits (SDKs), objects, etc.).

In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, etc.

In some embodiments, the inventive adaptive self-trained computer engines with associated devices may be configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Basic, AJAX, Javascript). The aforementioned examples are, of course, illustrative and not restrictive.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

In one example implementation, a multi-processor system may include a plurality of processor chips each of which includes at least one I/O component. Each of the processor chips may also include a voltage regulation circuit configured to regulate a voltage of one or more of the processor chips. In some embodiments, the voltage regulation circuit of each of the processor chips may provide one or more voltage domains of the respective processor chip. In some embodiments, the multi-processor system may further include one or more additional electronic components, e.g., inductors, as part of the package. In some embodiments, the multi-processor system may include at least 10,000 processor chips and may be packaged into a total volume of no more than 8 m.sup.3. In some embodiments, a density of the processor chips may be greater than 1,000 chips per cubic meter. In some embodiments, a latency of the multi-processor system, having more than 1,000 processor chips, may be less than 200 nanoseconds (ns).

In one example implementation, a multi-processor system may include an inter-processor interconnect (IPI) and a plurality of processor chips. The processor chips are configured to communicate data to one another through the IPI. Each of the processor chips may include one or more cores and one or more level 1 (L1) caches. Each of the L1 caches may be associated with a respective core through a respective core-cache bandwidth. Each of the processor chips may also include at least one memory controller and one or more local memory devices. Each of the local memory devices may be associated with the at least one memory controller through a respective local memory bandwidth. Each of the processor chips may further include an on-chip interconnect (OCI) that is associated with the one or more cores and the at least one memory controller of that processor chip. The OCI is also associated with the IPI of the multi-processor system. The association between the OCI and the plurality of cores of that processor chip is through a bandwidth that is greater than 50% of an aggregate core bandwidth, which is approximately the sum of each core-cache bandwidth of that processor chip. The association between the OCI and the at least one memory controller of that processor chip is through a bandwidth that is greater than 50% of an aggregate memory bandwidth, which is approximately the sum of each local memory bandwidth of that processor chip. The association between the OCI and the IPI of the multi-processor system is through an injection bandwidth. In some embodiment, the injection bandwidth is greater than 50% of the aggregate core bandwidth of that processor chip. In some embodiment, the injection bandwidth is greater than 50% of a sum of the aggregate core bandwidth and the aggregate memory bandwidth of that processor chip.

In some embodiments, the exemplary inventive multi-engine AST system may be programmed/configured to acquire and/or process audible speech recordings from one or more users which may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, the exemplary inventive multi-engine AST system may be configured to generate datasets of training data from samples of human-generated speech and associated text to self-train the exemplary inventive multi-engine AST system to generate, from data representative of electronically acquired human speech (e.g., real-time processing), electronic messages and/or actions such as, but not limited to, messages and/or actions related to execution of financial transactions (e.g., trading of financial assets (e.g., stock, currency, bitcoin, physical and/or virtual commodities, etc.).

In some embodiments, the exemplary inventive multi-engine AST system may be configured to be trained during an iterative learning process when a user voices a set of representative number of words related to financial trades. In some embodiments, the exemplary inventive multi-engine AST system may be configured to record and store the user's speech into a least one audio file or database entry.

In some embodiments, the exemplary inventive multi-engine AST system may be configured to utilize audio files representative of various combinations of, for example, financial trades within the domain of numbers and typical trade keywords, as training data. In some embodiments, the exemplary inventive multi-engine AST system may be configured/programmed to utilize the audio files for training by determining at least one speaker identity signature of a particular user based, at least in part, on frequency spectrum of voice samples recoded in the audio files.

In some embodiments, as referenced herein, the term "hypothesis" is directed to a particular transcription output from a single speech-to-text engine utilizing a respective single speech recognition model, representing a transcript of a particular audio input/recording. In some embodiments, each hypothesis may be outputted with corresponding metadata such as, but not limited to, accuracy confidence metric(s) that is/are representative of how confident the particular engine is that the particular hypothesis is the accurate transcript of the corresponding audio input/recording.

In some embodiments, the accuracy confidence metric(s) may be computed based one of the following or any other similarly suitable method: a sentence-level confidence calculated via a difference between the total costs of the best and the second best hypotheses, a sentence-level confidence calculated by a phoneme-weighted average of individual word confidences derived from a word confusion matrix of hypotheses, a sentence-level confidence calculated by a character-weighted average of individual word confidences derived from a word confusion matrix of hypotheses, sentence-level confidence calculated based on a product of n-gram probabilities from a particular language model, a difference between the Levenshtein differences between characters in the best hypothesis and the highest probable phrase from a particular n-gram language model.

In some embodiments, the accuracy confidence metric returned along with the hypothesis of the transcript from the engine may be a statistical correlation coefficient of 0.5 or greater when correlated against the accuracy of the transcript. In some embodiments, the accuracy confidence metric returned along with the hypothesis of the transcript from the engine may be a statistical correlation coefficient of 0.6 or greater when correlated against the accuracy of the transcript. In some embodiments, the accuracy confidence metric returned along with the hypothesis of the transcript from the engine may be a statistical correlation coefficient of 0.7 or greater when correlated against the accuracy of the transcript. In some embodiments, the accuracy confidence metric returned along with the hypothesis of the transcript from the engine may be a statistical correlation coefficient of 0.8 or greater when correlated against the accuracy of the transcript. In some embodiments, the accuracy confidence metric returned along with the hypothesis of the transcript from the engine may be a statistical correlation coefficient of 0.9 or greater when correlated against the accuracy of the transcript.

In some embodiments, as referenced herein, the term "benchmark set" is directed to an inventive compilation/library/data structure that at least includes a set of digitized audio recordings/files, a set of respective transcripts (hypotheses), and any respective metadata (e.g., accuracy confidence metric(s)).

In some embodiments, the exemplary inventive multi-engine AST system is configured to receive, during a training phase, a set of audio recordings and accompanying transcribed text (i.e., benchmark set) that may be tagged according to, but not limited to, one or more content properties in a hierarchy of importance (e.g., language, audio quality, accent, topic of conversation, etc.) and be subject to user's preference and/or self-determination for pre- and post-transcription processing settings (e.g., the pre-transcription importance ranking: language, audio quality, and accent; the post-transcription importance ranking: a topic of conversation). In some embodiments, the exemplary inventive multi-engine AST system may be configured so that an array of transcription engines are utilized to transcribe the audio files in the inventive benchmark set and return one or more hypotheses and respective confidence metric(s) per particular hypothesis.

In some embodiments, for example, the array of speech-to-text transcription engines could encompass engines that are based on one or more of the following distinct speech recognition models: a phoneme-based acoustic Gaussian mixture model, a phoneme-based acoustic hidden Markov model, a phoneme-based acoustic neural net model trained from forced phonetic alignments, a phoneme-based acoustic neural net model trained without forced phonetic alignments, a character-based acoustic neural net model, any of the above mentioned models coupled with an n-gram language model, any of the above mentioned models coupled with a generative, neural net language model.

In some embodiments, the exemplary inventive multi-engine AST system is configured to determine the accuracy of hypotheses returned by each engine by comparing to the benchmark set.

In some embodiments, the exemplary inventive multi-engine AST system is configured to address a computer-based technological problem associated with a desire to utilize multiple speech recognition models to improve efficiency and/or accuracy of the AST because distinct speech recognition models may return distinct metrics, and a typical AST computer processor, receiving hypotheses from these distinct speech recognition models, does not know which model would return the best hypothesis. Further, yet another computer-based technological problem exists because evaluating hypotheses from these distinct speech recognition models by the typical AST computer processor would be computationally expensive since such evaluation would typically entail that every audio input piece would require to be transcribed multiple times in parallel.

In some embodiments, to address at least the above identified technological problems, the exemplary inventive multi-engine AST system is configured to select a base speech-to-text engine programmed based on at least one speech recognition model from the array of speech-to-text engines, thus allowing to obtain a transcript with the fewest errors than any of distinct speech recognition models without submitting every piece of audio recording to multiple transcription engines. In some embodiments, the exemplary inventive multi-engine AST system is configured to compare the accuracy of the base engine to the remaining engines within each content property category in the pre-transcription category to determine according to each parameter if an alternative engine hypothesis exceeds the accuracy of the base engine. In some embodiments, the exemplary inventive multi-engine AST system is configured which improves computer processor(s) of a typical AST system by allowing multi-language conversations to be transcribed by a single computer processor leveraging multiple transcription models/engines. In some embodiments, the exemplary inventive multi-engine AST system is configured which improves computer processor(s) of a typical AST system by allowing multi-language conversations to be contemporaneously (at the same relative time period) transcribed by leveraging multiple transcription models/engines. In some embodiments, the exemplary inventive multi-engine AST system is configured which improves computer processor(s) of a typical AST system by allowing multi-language conversations to be simultaneously (at the same relative time moment) transcribed by leveraging multiple transcription models/engines.

In some embodiments, the exemplary inventive multi-engine AST system is configured to compare the accuracy of the base engine to the remaining engines across all confidence levels for the post-transcription content properties to determine at what confidence level for each category the base engine's hypothesis should be rejected in favor of an alternative hypothesis from an alternative engine having the higher accuracy. In some embodiments, the exemplary inventive multi-engine AST system is configured to utilize the accuracy confidence metrics from both the base engine and alternative engine as decision boundaries.

In some embodiments, the exemplary inventive multi-engine AST system is configured to utilize a content decision tree generated based, at least in part, on thresholds for pre-transcription content types and/or accuracy confidence-thresholds for post-transcription content types.

In some embodiments, the exemplary inventive multi-engine AST system is configured to split, during a decoding phase/stage, an input audio recording/file into segments of speech where each segment encompasses a single phrase (two or more words) of a single speaker. In some embodiments, words of the phrase form a (e.g., a component of a clause). In some embodiments, a particular conceptual unit does not form a complete sentence.

In some embodiments, the exemplary inventive multi-engine AST system is configured to utilize a pre-transcription audio classifier to determine, for each segment of the inputted speech, at least a language or a dialect spoken, an audio quality, and an accent of the speaker.

In some embodiments, the exemplary inventive multi-engine AST system is configured to submit each audio file for each segment to the base transcription engine that would meet pre-determined parameters of the language, audio quality, and accent based on the inventive content decision tree generated during the training phase.

In some embodiments, the exemplary inventive multi-engine AST system is configured to aggregate hypothesis/transcripts from all segments and the multiple engines into a single final transcript.

FIG. 1 shows a diagram of an exemplary innovative method of creating the exemplary inventive benchmark set in according to at least some embodiments of the present invention. For example, the exemplary inventive multi-engine AST system is configured to receive an input audio recording with accompanied "truth" text transcript. For example, the exemplary inventive multi-engine AST system is configured to segment the input audio recording into a plurality of audio files having portions of the input audio recording, where each portion (a single audio file) has duration of X seconds and corresponds to a single-speaker spoken phrase (101) of the accompanied transcript bounded by points of silence. In some embodiments, X may vary from 5 to 15 seconds. In some embodiments, X may vary from 1 to 60 seconds. In some embodiments, X may vary from 3 to 30 seconds. In some embodiments, X may vary from 5 to 20 seconds. In some embodiments, X may vary from 5 to 10 seconds.

Referring to FIG. 1, the exemplary inventive multi-engine AST system is configured to process the segmented audio files (102) through an exemplary audio classifier (104) for generating associated metadata (tagging) describing audio parameter(s)/characteristic(s) of each audio file, such as, but not limited to, language, audio quality, and accent (the first metadata). In some embodiments, the exemplary audio classifier (104) may be any suitable machine-learned model that would take input audio and outputs a label (e.g., "English" as language label, "Clear" as audio quality label, "New York" as accent label). In some embodiments, the set of labels output by the machine-learned model may be assigned to numeric values within a defined range (e.g. 0.1 to 5.0), where higher or lower values are determined to be either superior or inferior, such that superior labels can be compared to inferior labels in a numeric way when appropriate (e.g. audio quality). In some embodiments, the exemplary audio classifier may take in input audio files and tags them based on a hierarchy of audio characteristics, with the first characteristic, for example, being the most important in the speech recognition model selection. In some embodiments, the hierarchy of audio characteristics may be defined as language of the audio (the most important), then the audio quality, then the accent of the speaker (the least important). In some embodiments, the language of the audio and the accent of the speaker may be determined via an exemplary classification model that has been trained from a set of audio with labels of the language and/or accent they contain, where the features of the audio may be modeled using, for example, twenty mel-frequency cepstrum coefficients. In some embodiments, the exemplary classification model may be one of a machine-learned neural-network-type model, support vector machine, naïve Bayes model, or any model with an accuracy of 90% or higher on identifying the correct label. In some embodiments, depending on the source of the audio, the accuracy may be of 95% or higher. In some embodiments, depending on the source of the audio, the accuracy may be of 99% or higher. In some embodiments, depending on the source of the audio, the accuracy may be of 80% or higher. In some embodiments, depending on the source of the audio, the accuracy may be of 85% or higher. In some embodiments, the language and accent classifiers may be two independently trained classifiers, or a single classifier that outputs a composite label. In some embodiments, the audio quality may be scored, for example, without limitation, via the sum of the sample rate, signal to noise ratio, and product of the number of peaks within the human voice spectrum and the degree of clipping, less the mean amplitude. For example, each value in the audio quality calculation may be normalized by a weight. For example the audio quality can be defined as:

$$AQ(r, s, p, d, m) = \frac{r}{w_r} + \frac{s}{w_s} + \frac{p^* d}{w_p} - \frac{m}{w_m}$$

where "r" is the sample rate, "s" is the signal to noise ratio, "p" is the number of peaks within the human voice spectrum, "d" is the degree of clipping (measured as the number of samples within 5% of the maximum value over the total number of samples), and "n" is the mean amplitude. For example, the weights (e.g., w.sub.r, w.sub.s, w.sub.p, w.sub.m) may be determined as values that maximize a correlation of the audio quality to accuracy within the benchmark set and simultaneously maintain, for example, a value between 0.1 and 5.0.

In some embodiments, the exemplary inventive multi-engine AST system is also configured to process, for example, in parallel, the corresponding "truth" text transcripts (103) of the segmented audio files (102) through an exemplary text classifier (105) to also generate additional text-related metadata (tagging) such as, but not limited to, the content category and other similarly suitable features of each text (the second metadata). In some embodiments, the exemplary text classifier (105) may be any suitable machine-learned model that would take input text and outputs a label (e.g., "fashion", "health", "food", "price", etc.)

In some embodiments, the exemplary text classifier (105) may be a classification model trained from a set of text with labels of the content types, where the features of the text may be, for example without limitation, the one-to-three word phrase that include each set of text. In some embodiments, the classification model may be one of a machine-learned neural-network type model, support vector machine, naïve Bayes model, or any model with an accuracy of 90% or higher on identifying the correct label. In some embodiments, depending on the source of the text, the accuracy may be of 95% or higher. In some embodiments, depending on the source of the text, the accuracy may be of 99% or higher. In some embodiments, depending on the source of the text, the accuracy may be of 80% or higher. In some embodiments, depending on the source of the text, the accuracy may be of 85% or higher. For example, the content types may describe the types of phrases within a language that are represented in the text, such as general conversation English, financial-domain focused English, medical terminology, personal identification information, and so on. In some embodiments, the exemplary inventive multi-engine AST system may be configured to utilize transcripts containing alternate phonetic possibilities to improve the determination of the content type by the exemplary text classifier (105).

Figure 2:
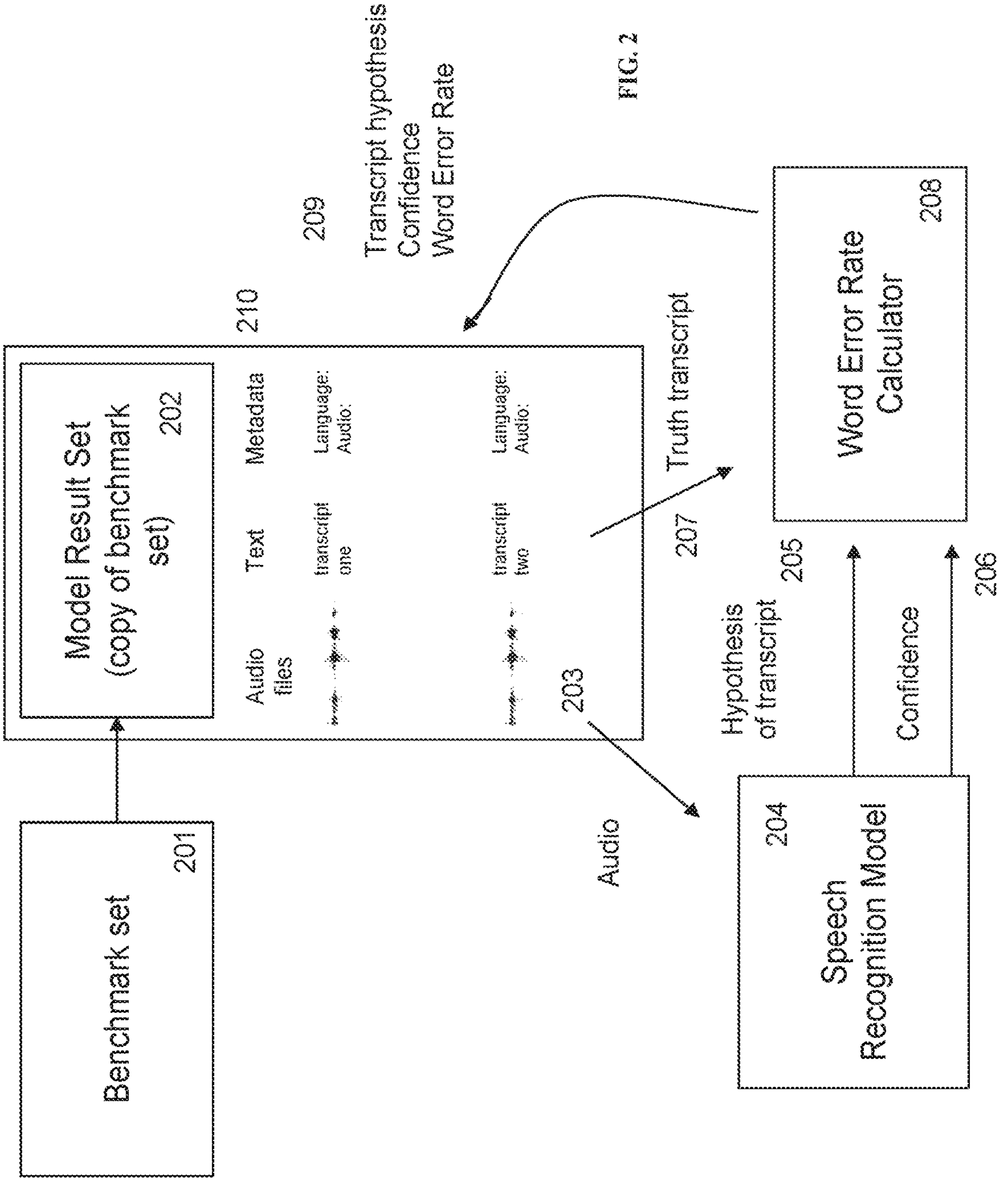

In some embodiments, the exemplary inventive multi-engine AST system is configured to combine the first and the second metadata, as, for example without limitations, as JSON-formatted metadata with corresponding audio files and transcripts to form the benchmark set (106). In some embodiment, the benchmark set (106) may be stored in the form of Referring to FIG. 2, during the training stage, the exemplary inventive multi-engine AST system is configured to benchmark various speech-to-text engines, each corresponding to one or more of speech recognition models. For example, the exemplary inventive multi-engine AST system is configured to utilize the benchmark set (201), which is the same benchmark set (106) from FIG. 1, as a model result set (202) associated with a particular speech recognition model. For example, the exemplary inventive multi-engine AST system is configured to submit the audio files (203) to the particular speech recognition model (204), which in turn returns at least one hypothesis of the transcript (205) and accuracy confidence metric(s) (206). For example, the exemplary inventive multi-engine AST system is configured to combine the hypothesis (205) and the accuracy confidence metric(s) (206) with the "truth" transcript (207) from the model result set (202) and submit them to a word error rate (WER) calculator (208), the specialized software routine. In some embodiments, the WER calculator (208) is configured to determine the level of error in each hypothesis compared to the corresponding "truth" transcript (i.e., the transcript of the audio file as determined by a human listener), and combines the WER, confidence metric(s), and the hypothesis into a data object (209) that the exemplary inventive multi-engine AST system is configured to merge with the original metadata in the model result set (202) to form an benchmarked model result set. For example, the exemplary inventive multi-engine AST system is configured to repeat the same process with each speech recognition model of each speech-to-text engine.

In some embodiments, each particular speech recognition model can be any suitable machine-learned model that takes input audio files and returns at least one hypothesis of the transcript. In some embodiments, the confidence metric (e.g., confidence score) may be computed by the individual speech recognition model and may use any suitable computation method so long as the confidence metric (e.g., confidence score) score would be between 0 and 1. In some embodiments, the confidence score may be based on the log-likelihood difference between the first and second most likely similar but distinct hypotheses that exist for a given input audio. For example, a valid confidence score correlates with the accuracy with a correlation of at least 0.6. For example, the valid confidence score correlates with the accuracy with a correlation of at least 0.5. For example, the valid confidence score correlates with the accuracy with a correlation of at least 0.7. For example, the valid confidence score correlates with the accuracy with a correlation of at least 0.8. For example, the valid confidence score correlates with the accuracy with a correlation of at least 0.9.

In some embodiments, regarding the WER calculator (208) is configured to compare each hypothesis to the "truth" transcript and to score the number errors in the hypothesis based on the sum of substituted, deleted, and inserted words in the hypothesis as compared to the "truth" transcript. In some embodiments, the sum of errors may be normalized by the total number of words in the "truth" transcript to obtain the WER:

$$WER = \frac{S + D + I}{N}$$

where "S" is the number of substitutions, "D" is the number of deletions, "I" is the number of insertions and "N" is the number of words in the "truth" transcript. For example, if the "truth" transcript of "testing one two three" is compared to a hypothesis of "testing one to three", the sum of substituted and inserted words over the total words in the initial transcript is 2 divided by 4, or a 50% WER.

Figure 3:
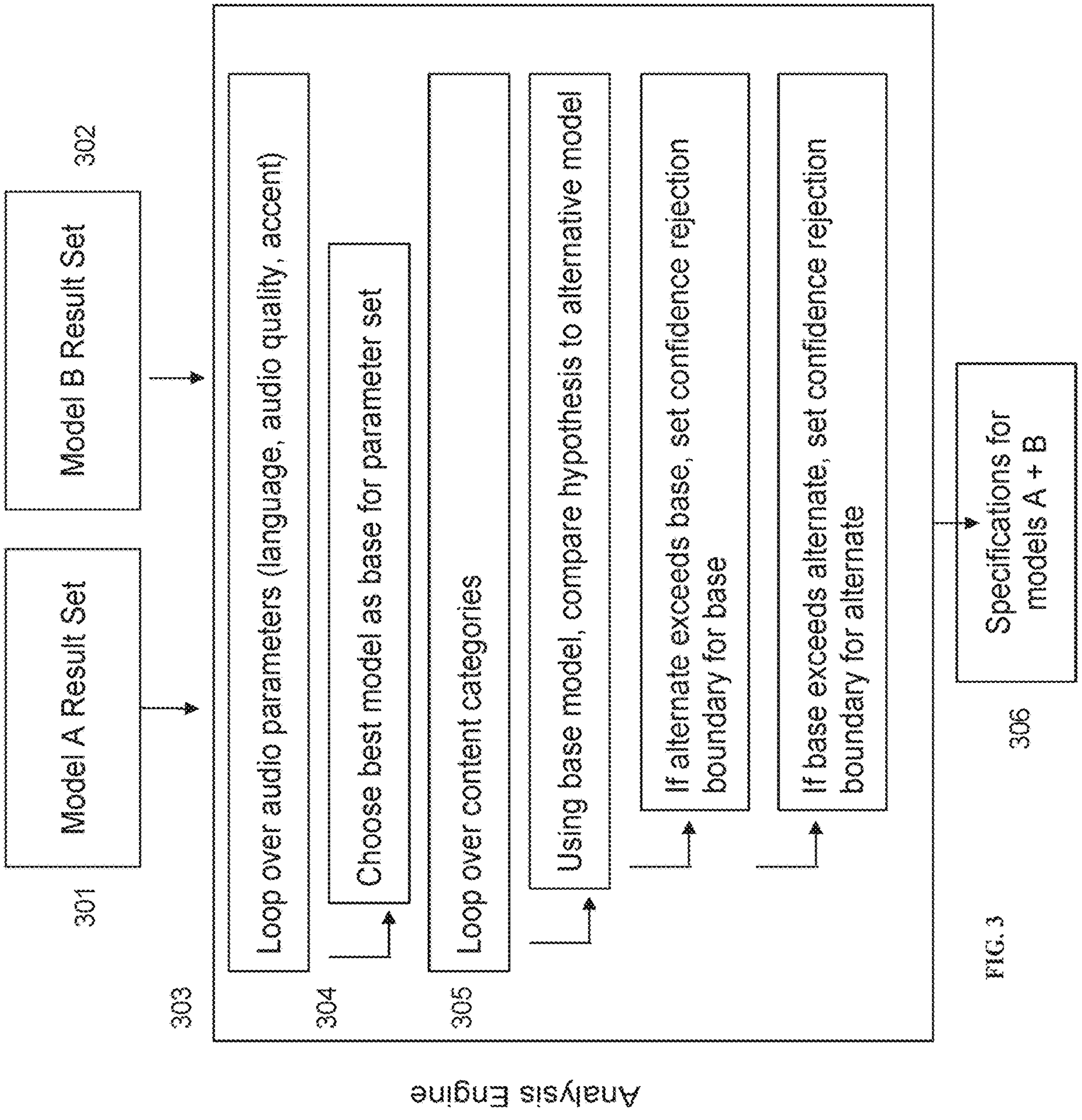

Referring to FIG. 3, as part of the training stage, the exemplary inventive multi-engine AST system is configured to determine boundary conditions of the leaves of a decision tree for evaluating the transcription from two speech recognition models. For example, the exemplary inventive multi-engine AST system is configured to obtain the model result sets (from FIG. 2) for Model A (301) and Model B (302) and then pass them thought its exemplary analysis engine (303) to create the decision tree boundaries. For example, the exemplary analysis engine (303) is configured to complete its analysis in two parts: making pre-transcription decision(s) based on the audio signal metric(s) for selection of a base model (304) and post-transcription decision(s) on the content category/type of the text for determination of hypothesis acceptance or rejection based on the confidence metric(s) (305). In some embodiments, for each set of transcription decisions, the WER from the model result set is used to determine the best model (a model exceeds another model at speech recognition (transcription) when WER of its hypothesis is lower than WER of the other model's hypothesis).

Further referring to FIG. 3, the analysis engine 303 thus compares Model A's model result set (301) and Model B's model result set (302) to determine the content categories/types (such as, but not limited to, general English, financial-domain language, financial trade, address, date, etc.) that each model exceeds at transcribing. Further referring to FIG. 3, at the first phase, the analysis engine (303) is configured to score each speech recognition model on the pre-transcription evaluation parameter(s)/characteristic(s) of the audio signal (e.g., audio content language, audio content accent, and audio quality). For each characteristic, the result sets of speech recognition models are analyzed to determine values of the labels at which a particular speech recognition model exceeds the other model(s) in performance as measured by the lowest WER. In some embodiments, for label-based characteristics/metrics (e.g., language, accent), the model specification may simply include a qualification that the corresponding model is capable of transcribing that content by observing a hypothesis that has a sufficient accuracy (e.g., <50% WER). In some embodiments, for threshold-based characteristics/metrics, a value for each characteristic (e.g., 0.1 to 5 for audio quality; 0 to 1 for the confidence) is saved to be used to choose the base model for a particular audio segment.

Further referring to FIG. 3, during the second phase, the analysis engine (303) is configured to score speech recognition model on the post-transcription evaluation parameter(s)/characteristic(s) of their resulting text: for example, the content type of the transcript. In some embodiments, a confidence threshold (CT) may range from 0.1 to 5 for each speech recognition model in order to determine which transcript to use for a given audio segment. For example, the CT may be the threshold at which a transcript from a particular speech recognition model with a confidence lower than the threshold would be rejected. For example, in some embodiments, the exemplary inventive multi-engine AST system may be configured to determine the WERs of the base model and the alternative model for different CTs per model for subsets of the benchmark sets corresponding to each content type and audio quality in the available labels. For example, in some embodiments, CTs may be tuned to minimize the overall WER of each subset of the benchmark data, by accepting all hypotheses from the base model whose confidences are larger than the base model CT and accepting all hypotheses from the alternate model whose confidences exceed the alternate model CT. For example, if the WER defined for CTs is lower than each individual model's WER, the CT's specifications are accepted as valid. In some embodiments, utilizing the CTs for both models, the entire benchmark set may be re-evaluated to determine the overall WER if the CTs had been used to determine the best hypothesis. If the WER utilizing the CTs is lower than each individual model's WER, the CT specifications are accepted as valid.

In some embodiments, the resulting decision boundaries that the exemplary inventive multi-engine AST system is configured to utilize, based, at least in part, on the audio content and transcription content, to select a particular speech recognition model over another model are stored as model specification data structures/files (306) that can be individually maintained per model or be composite specification for two or more models. For example, a model could have a boundary value for audio quality of 2.5 and a confidence boundary value of 0.8, indicating that audio must have an audio quality greater than 2.5 to be transcribed by the specified model, and the resulting hypothesis must have a confidence value higher than 0.8 in order to be accepted.

Figure 4:
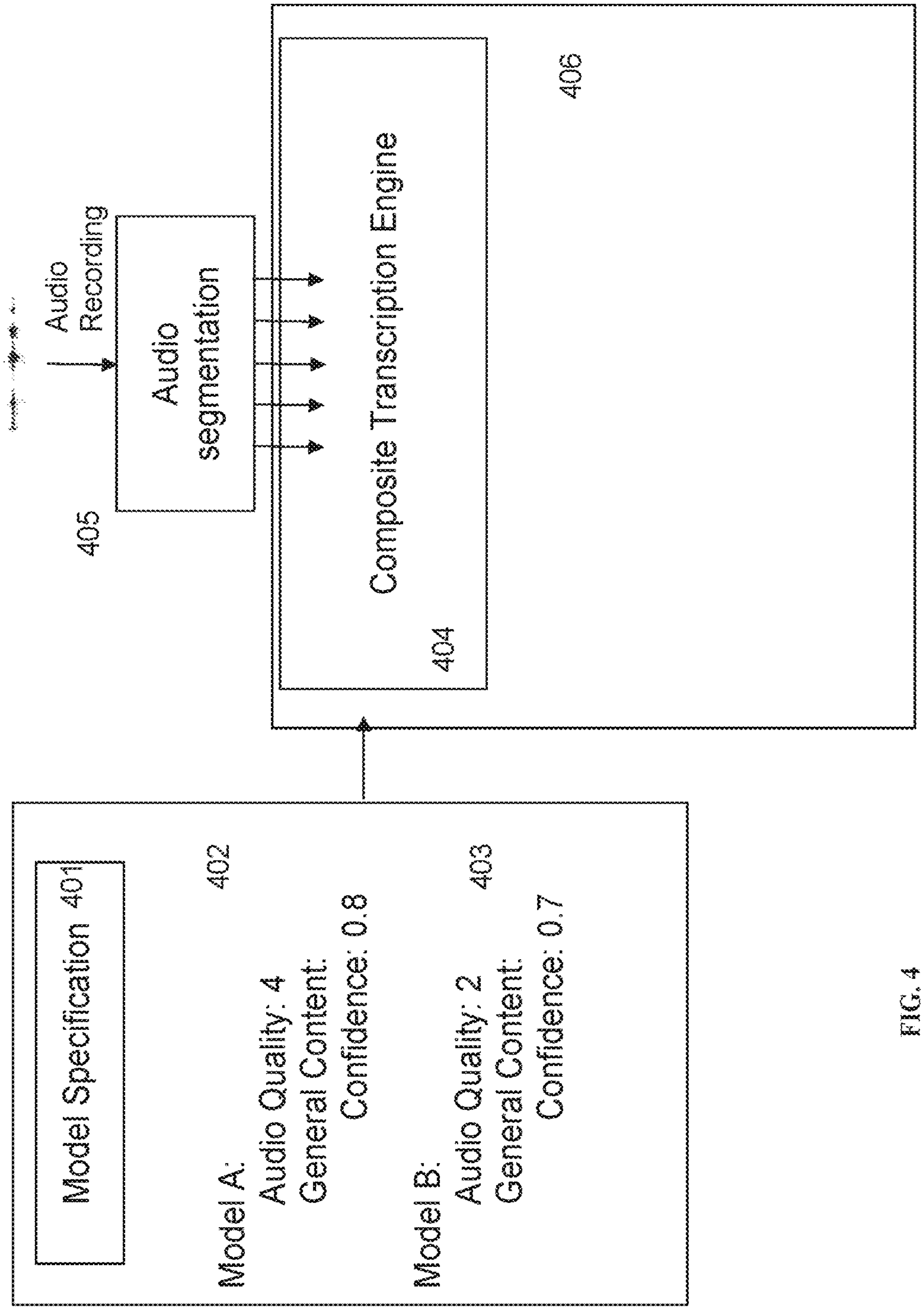

Referring to FIG. 4, the exemplary inventive multi-engine AST system is configured to utilize at least one speech recognition model specification covering one or more distinct speech recognition models (e.g., 306) to automatically transcribe a new audio recording by making decisions about speech recognition model selection and hypothesis acceptance. For example, the exemplary inventive multi-engine AST system may include an exemplary composite transcription engine (404) that would receive, obtain and/or store each model specification file (401) that would contains model specification for each speech recognition model (e.g., the model A (402) and the model B (403) in this example). As detailed herein, the model specification file 401 that would include the pre-transcription and post-transcription classification specifications for both model A (402) and model B (403) such as both audio-level classification boundaries (such as audio quality) that are used to determine the base model for the first pass of the transcription and text content-level classification boundaries that are used to determine whether a hypothesis should be accepted or rejected. In some embodiments, similarly to FIG. 2, the exemplary inventive multi-engine AST system is configured to begin the transcription process of the new audio recording (405) by segmenting the audio recording into audio files, where each audio file corresponds to a single phrase of a single speaker. In some embodiments, the exemplary inventive multi-engine AST system is configured to feed each segmented audio file into the exemplary composite transcription engine (404). Then, the exemplary composite transcription engine (404) is configured to proceed in accordance with exemplary decision process (406) to evaluate each individual segment.

Referring to FIG. 4, in some embodiments, the composite transcription engine (404) is configured to determine the best model for a given audio segment in a two-phase process. For example, in the first phase, the composite transcription engine (404) is configured to select a model that is more likely to produce the most accurate hypothesis through only the analysis of the audio and without the need to transcribe from all available engines, saving computational time as opposed to analyzing all possible hypotheses from all engines. For example, the first phase of the analysis that the composite transcription engine (404) may perform is based at least in part on calculating a metric "Q" for each speech recognition model:

$$Q(v, x) = q(r, s, p, d, m) * l(w) * a(w)$$

$$v = (w, r, s, p, d, m)$$

$$x = (m.sub.b, m.sub.l, m.sub.a, m.sub.c)$$

where "w" is a vectorized representation of the features of the audio file; "r", "s", "p", "d", and "m" are the sample rate, signal to noise, frequency peaks in the human voice range, degree of clipping, and mean amplitude, respectively; "x" is the model specification for a given model; "m.sub.b" is the audio quality boundary of the model, "mi" is the set of acceptable languages that the model can transcribe at WER of less than 50%, "m.sub.a" a is the set of acceptable accents that the model can transcribe at WER of less than 50%; "m.sub.c" is the set of content-dependent confidence boundaries; "q", "l" and "a" are functions that evaluate the audio quality, language, and accent, respectively, of the audio file as shown below based on the input audio vector and/or the model specification parameters:

$$q(r, s, p, d, m, m_b) = \begin{cases} 1, & AQ(r, s, p, d, m) \geq m_b \\ 0, & AQ(r, s, p, d, m) < m_b \end{cases}$$

$$l(w.m_l) = \begin{cases} 1, & L(w) \in m_l \\ 0, & otherwise \end{cases} a(w.m_a) = \begin{cases} 1, & A(w) \in m_a \\ 0, & otherwise \end{cases}$$

In the above example, "AQ" is the audio quality function presented previously, "L(w)" is the language classifier that takes the input audio feature vector and returns a label of the language, and "A(w)" is the accent classifier that takes the input audio feature vector and returns a label of the accent.

For example, the available speech recognition models for transcription based on "Q" can be found as the set "T" given "v" (audio parameters):

$$T(c) = \{x \in M \mid Q(v, x) = 1\}$$

where "x" is the set of model specifications as above and "M" is the set of model specifications for all available models. In some embodiments, if the set "T" contains multiple models, the one with the lowest audio quality boundary "m.sub.b" would be chosen.

In some embodiments, once a particular speech recognition model has been chosen by the composite transcription engine (404) and the model returns at least one hypothesis and the confidence level for the transcription of the respective audio segment, the composite transcription engine (404) is configured to evaluate a second metric "R" to determine if a second pass of transcription should occur. In some embodiments, this second phase metric R may be defined as follows:

$$u = C(t)R(c, m_c, u) = \begin{cases} 1, & c \geq m_c(u) \\ 0, & c < m_c(u) \end{cases}$$

where "u is the content type determined by passing the text "t" into the text classifier "C", "c" is the confidence metric returned from the initial transcription, "m.sub.c" is the confidence boundary dependent on the content type "u" as determined in the model specification. If "R" equals "1", then the hypothesis is accepted. If "R" equals "0", then another model is chosen for the second phase of transcription. For example, the composite transcription engine (404) is configured to determine one or more speech recognition models out of the available models "V" for second pass of transcription, based, at least in part, on the content type of the text:

$$V(u) = \{x \in T \mid x[m.sub.c(u)] > 0.01\},$$

where "x" is the model specification, "T" is the set of speech recognition (transcription) models previously found without the model first used for transcription, and "x[$m_c$(u)]" is the confidence boundary of the specific content type detected for each model specification "x". If the confidence is greater than the minimum value, such model would be considered a viable model by the composite transcription engine (404). If multiple models are contained within set "V", then the composite transcription engine (404) is configured to select the one with the highest confidence "m.sub.c(u)" as best for the second phase transcription.

In some embodiments, once the second pass of transcription has occurred with the at least one second model and at least second hypothesis and confidence metric have been returned by the respective model, the composite transcription engine (404) may be configured to utilize the same metric "R" to evaluate the second hypothesis. If "R" equals "0" for the second hypothesis, then, the composite transcription engine (404) may be configured to accept the first model (i.e., previously rejected at the first pass with "R" equals "0"). If "R" equals "1", then the composite transcription engine (404) is configured to accept the second hypothesis.

For example, the exemplary decision process (406) of the composite transcription engine (404) is presented where, first, the particular audio file is scored on a single pre-transcription audio characteristic of audio quality. For example, the audio quality score is determined to be less than the value of "2" on a scale where "0.1" is the lowest value describing a low audio quality and "5" is the highest value describing the highest audio quality. In some embodiments, the audio quality score may strongly correlate with WER for a given audio file, where a negative correlation of 0.97 exists between the audio quality and WER for a given audio file reproduced with varying audio quality. For example, the composite transcription engine (404) is configured to compare the value of the audio quality of the audio file to the specifications of the models A (402) and B (403) to determine which model should be used for the first pass of transcription. For example, because the audio quality is less than "2", the composite transcription engine (404) would choose the model B as it was previously determined to be the best for audio quality of "2" or lower during the training phase. In this example, only "q" is evaluated for the "Q" metric above, and "1" and "a" are assumed to evaluate to "1".

In some embodiments, the composite transcription engine (404) is configured to continue with the decision process after the model B returns at least one hypothesis of the transcript, such as "testing one two three" or any series of words in text. In such case, for example, the model B outputs a confidence score of 0.6 for the model B hypothesis. In some embodiments, the composite transcription engine (404) is configured to compare the outputted confidence matric value to the confidence threshold (CT) in the model specification for model B, which is listed as 0.7. Because the confidence is lower than the model B confidence threshold in the specification, the model hypothesis would be rejected for the moment. In some embodiments, the composite transcription engine (404) is configured to then search for an alternative model, which in this case (FIG. 4) model A is the only remaining model to conduct a second pass of transcription.

Again, in some embodiments, the composite transcription engine (404) is configured to continue with the decision process after the model A returns at least one Model A hypothesis of the transcript and an accompanied confidence score of 0.85. In some embodiments, the composite transcription engine (404) is configured to compare the outputted confidence matric value to the confidence threshold (CT) in the model specification for model A, which is listed as 0.8. Because the confidence is higher than the model A confidence threshold, the composite transcription engine (404) would accept the model A hypothesis. In case, the outputted confidence matric value confidence would have been lower than the model A confidence threshold, the hypothesis the composite transcription engine (404) would have rejected the model A hypothesis, and the previous hypothesis from model B would have been accepted as the final hypothesis.

Figures 5A, 5B:
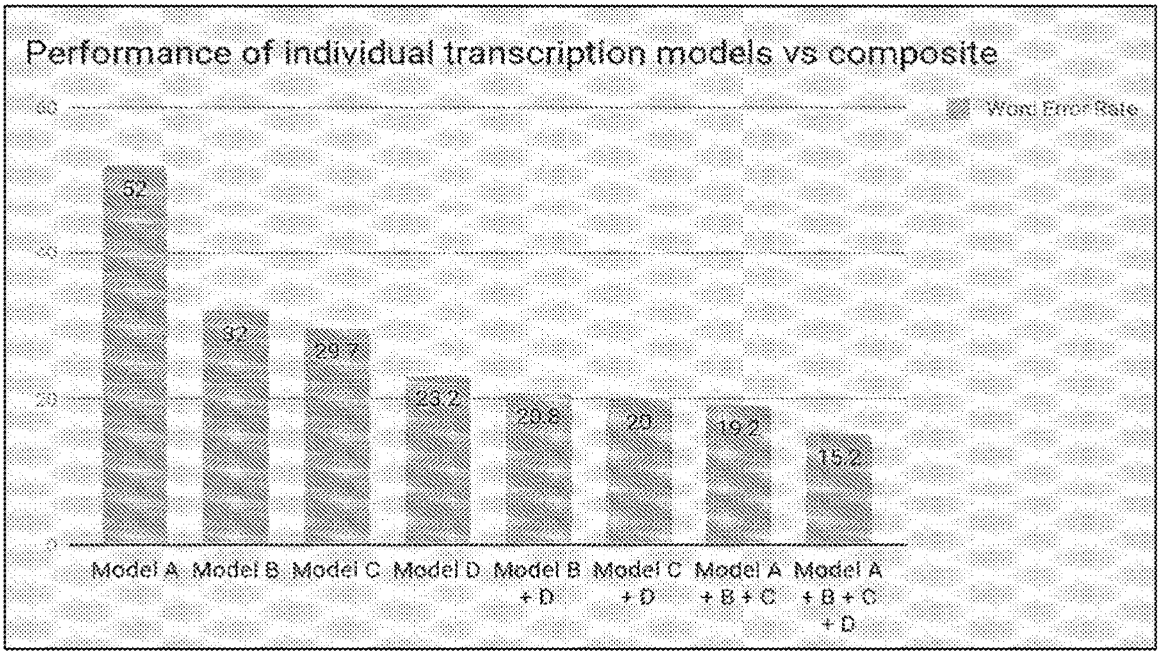

FIG. 5A shows a WER graph for four different models trained on various content types (post-transcription property) and the audio quality (pre-transcription property) as tabulated in a table shown in FIG. 5B. As the graph of FIG. 5A illustrates the WER dramatically decreases when all four speech recognition models are used, for example, in the transcription of the new audio recording (405).

The word error rate of the complete test audio file transcription comprising all segments by each of the models is shown in 501, where a lower word error rate is more desirable and indicative of better performance. A model specification of all four models A, B, C, and D utilized by the composite transcription engine outperforms all individual models as well as smaller subset combinations of less than four of the four models. In this case, the composite 4 model engine has a word error rate of 15.2%, compared to 23.2%-52% for the individual models. It should be noted that the 15.2% WER of the 4-model composite runs through both phases of the analysis during decoding. If only phase one is run and only the Q metric is evaluated to determine the best engine, the WER increases to 19.2%.

During a transcription phase, the model specification is read by a composite transcription engine containing all models and used to determine which audio segments should be transcribed by which engine, and which hypothesis from the engines should be accepted or rejected. An example composite transcription engine is presented where the individual four models achieve word error rate of 23.2% to 52% individually, but 15.2% as a composite.

In some embodiments, the present invention provides for an exemplary inventive computer-implemented method for improving computer speed and accuracy of automatic speech transcription that includes at least the steps of: generating, by at least one processor, at least one speech recognition model specification for a plurality of distinct speech-to-text transcription engines; where each distinct speech-to-text transcription engine corresponds to a respective distinct speech recognition model; where, for each distinct speech-to-text transcription engine, the at least one speech recognition model specification at least identifies: i) a respective value for at least one pre-transcription evaluation parameter, and ii) a respective value for at least one post-transcription evaluation parameter; receiving, by the at least one processor, at least one audio recording representing at least one speech of at least one person; segmenting, by the at least one processor, the at least one audio recording into a plurality of audio segments; where in each audio segment corresponds to a respective single phrase of a respective single person that has been bounded by points of silence in the at least one audio recording; determining, by the at least one processor, based on the respective value of the at least one pre-transcription evaluation parameter of the respective distinct speech recognition model in the at least one speech recognition model specification, a respective distinct speech-to-text transcription engine from the plurality of distinct speech-to-text transcription engines to be utilized to transcribe a respective audio segment of the plurality of audio segments; submitting, by the at least one processor, the respective audio segment to the respective distinct speech-to-text transcription engine; receiving, by the at least one processor, from the respective distinct speech-to-text transcription engine, at least one hypothesis for the respective audio segment; accepting, by the at least one processor, the at least one hypothesis for the respective audio segment based on the respective value of the at least one post-transcription evaluation parameter of the respective distinct speech recognition model in the at least one speech recognition model specification to obtain a respective accepted hypothesis for the respective audio segment of the plurality of audio segments of the at least one audio recording; where the accepting of the at least one hypothesis for each respective audio segment as the respective accepted hypothesis for the respective audio segment removes a need to submit the respective audio segment to another distinct speech-to-text transcription engine from the plurality of distinct speech-to-text transcription engines resulting in the improved computer speed and the accuracy of automatic speech transcription; generating, by the at least one processor, at least one transcript of the at least one audio recording from respective accepted hypotheses for the plurality of audio segments; and outputting, by the at least one processor, the at least one transcript of the at least one audio recording.

In some embodiments, the generating of the at least one speech recognition model specification for the plurality of distinct speech-to-text transcription engines includes: receiving, by the at least one processor, at least one training audio recording and at least one truth transcript of the at least one training audio recording: segmenting, by the at least one processor, the at least one training audio recording into a plurality of training audio segments and the at least one truth transcript into a plurality of corresponding truth training segment transcripts; applying, by the at least one processor, at least one pre-transcription audio classifier to each training audio segment of the plurality of training audio segments to generate first metadata classifying each training audio segment based at least on: i) language, ii) audio quality, and iii) accent; applying, by the at least one processor, at least one text classifier to each corresponding truth training segment transcript of the plurality of corresponding truth training segment transcripts to generate second metadata classifying each corresponding truth training segment transcript based at least on at least one content category; combining, by the at least one processor, the plurality of training audio segments, the plurality of corresponding truth training segment transcripts, the first metadata, and the second metadata to form at least one benchmark set; testing, by the at least one processor, each distinct speech-to-text transcription engine of the plurality of distinct speech-to-text transcription engines based on the at least one benchmark set to form a plurality of model result sets; where each model result set corresponds to the respective distinct speech-to-text transcription engine; where each model result set includes: i) the at least one benchmark set, ii) at least one model-specific training hypothesis for each training audio segment, iii) at least one confidence value associated with the at least one model-specific training hypothesis, and iv) at least one word error rate (WER) associated with the at least one model-specific training hypothesis; determining, by the at least one processor, a respective set of transcription decisions for each distinct speech-to-text transcription engine of the plurality of distinct speech-to-text transcription engines, where the respective set of transcription decisions defines, for each distinct speech-to-text transcription engine, the value of the at least one pre-transcription evaluation parameter and the value of the at least one post-transcription evaluation parameter; and combining, by the at least one processor, each respective set of transcription decisions for each distinct speech-to-text transcription engine of the plurality of distinct speech-to-text transcription engines into the at least one speech recognition model specification for the plurality of distinct speech-to-text transcription engines.

In some embodiments, the at least one pre-transcription evaluation parameter is selected from the group of: i) the language, ii) the audio quality, and iii) the accent.

In some embodiments, the respective set of transcription decisions includes at least one of: i) a pre-transcription importance ranking of a plurality of pre-transcription evaluation parameters, and ii) a post-transcription importance ranking of a plurality of post-transcription evaluation parameters.

In some embodiments, the at least one post-transcription evaluation parameter is a confidence threshold.

In some embodiments, each segment of the plurality of audio segments lasts between 5 and 15 seconds.

In some embodiments, the at least one audio recording is real-time streamed audio of the at least one speech of the at least one person.

In some embodiments, the at least one audio recording includes at least two speeches of at least two people; where the generating the at least one transcript of the at least one audio recording further includes: generating a first transcript of a first speech of a first person, and generating a second transcript of a second speech of a second person; and where the outputting the at least one transcript of the at least one audio recording further includes: outputting the first transcript of the first speech of the first person, and outputting the second transcript of the second speech of the second person.

In some embodiments, the at least two speeches are in distinct languages.

In some embodiments, the respective distinct speech recognition model is selected from the group consisting of: i) a phoneme-based acoustic Gaussian mixture model, ii) a phoneme-based acoustic hidden Markov model, iii) a phoneme-based acoustic neural net model trained from forced phonetic alignments, iv) a phoneme-based acoustic neural net model trained without forced phonetic alignments, v) a character-based acoustic neural net model, vi) any of i-v models coupled with an n-gram language model, and vii) any of i-v models coupled with a generative, neural net language model.

In some embodiments, the present invention provides for an exemplary inventive system for improving computer speed and accuracy of automatic speech transcription that includes at least components of: at least one specialized computer, including: a non-transient computer memory, storing particular computer executable program code; and at least one computer processor which, when executing the particular program code, is configured to perform at least the following operations: generating at least one speech recognition model specification for a plurality of distinct speech-to-text transcription engines; where each distinct speech-to-text transcription engine corresponds to a respective distinct speech recognition model; where, for each distinct speech-to-text transcription engine, the at least one speech recognition model specification at least identifies: i) a respective value for at least one pre-transcription evaluation parameter, and ii) a respective value for at least one post-transcription evaluation parameter; receiving at least one audio recording representing at least one speech of at least one person; segmenting the at least one audio recording into a plurality of audio segments; where in each audio segment corresponds to a respective single phrase of a respective single person that has been bounded by points of silence in the at least one audio recording; determining, based on the respective value of the at least one pre-transcription evaluation parameter of the respective distinct speech recognition model in the at least one speech recognition model specification, a respective distinct speech-to-text transcription engine from the plurality of distinct speech-to-text transcription engines to be utilized to transcribe a respective audio segment of the plurality of audio segments; submitting the respective audio segment to the respective distinct speech-to-text transcription engine; receiving, from the respective distinct speech-to-text transcription engine, at least one hypothesis for the respective audio segment: accepting the at least one hypothesis for the respective audio segment based on the respective value of the at least one post-transcription evaluation parameter of the respective distinct speech recognition model in the at least one speech recognition model specification to obtain a respective accepted hypothesis for the respective audio segment of the plurality of audio segments of the at least one audio recording; where the accepting of the at least one hypothesis for each respective audio segment as the respective accepted hypothesis for the respective audio segment removes a need to submit the respective audio segment to another distinct speech-to-text transcription engine from the plurality of distinct speech-to-text transcription engines resulting in the improved computer speed and the accuracy of automatic speech transcription; generating at least one transcript of the at least one audio recording from respective accepted hypotheses for the plurality of audio segments; and outputting the at least one transcript of the at least one audio recording.

While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A non-transitory computer readable medium comprising instructions that, when executed by a processor in a first computing device of a plurality of computing devices, direct the processor to:

generate at least one speech recognition model specification for a plurality of distinct speech-to-text transcription engines;

wherein each distinct speech-to-text transcription engine corresponds to a respective distinct speech recognition model;

wherein, for each distinct speech-to-text transcription engine, the at least one speech recognition model specification at least identifies:

i) a respective value for at least one pre-transcription evaluation parameter, and ii) a respective value for at least one post-transcription evaluation parameter;

wherein the generation of the at least one speech recognition model specification comprises instructions that direct the processor to:

receive at least one training audio recording and at least one truth transcript of the at least one training audio recording;

segment the at least one training audio recording into a plurality of training audio segments and the at least one truth transcript into a plurality of corresponding truth training segment transcripts;

apply at least one pre-transcription audio classifier to each training audio segment of the plurality of training audio segments to generate first metadata classifying each training audio segment based at least on:

i) language, ii) audio quality, and iii) accent;

apply at least one text classifier to each corresponding truth training segment transcript of the plurality of corresponding truth training segment transcripts to generate second metadata classifying each corresponding truth training segment transcript based at least on at least one content category;

combine the plurality of training audio segments, the plurality of corresponding truth training segment transcripts, the first metadata, and the second metadata to form at least one benchmark set;

receive at least one audio recording representing at least one speech of at least one person;

segment the at least one audio recording into a plurality of audio segments;

wherein each audio segment corresponds to a respective single phrase of a respective single person that has been bounded by points of silence in the at least one audio recording;

determine, based on the respective value of the at least one pre-transcription evaluation parameter of the respective distinct speech recognition model in the at least one speech recognition model specification, a respective distinct speech-to-text transcription engine from the plurality of distinct speech-to-text transcription engines to be utilized to transcribe a respective audio segment of the plurality of audio segments;

submit the respective audio segment to the respective distinct speech-to-text transcription engine;

receive from the respective distinct speech-to-text transcription engine, at least one hypothesis for the respective audio segment;

accept the at least one hypothesis for the respective audio segment based on the respective value of the at least one post-transcription evaluation parameter of the respective distinct speech recognition model in the at least one speech recognition model specification to obtain a respective accepted hypothesis for the respective audio segment of the plurality of audio segments of the at least one audio recording;

wherein the accepting of the at least one hypothesis for each respective audio segment as the respective accepted hypothesis for the respective audio segment removes a need to submit the respective audio segment to another distinct speech-to-text transcription engine from the plurality of distinct speech-to-text transcription engines resulting in the improved computer speed and the accuracy of automatic speech transcription;

generate at least one transcript of the at least one audio recording from respective accepted hypotheses for the plurality of audio segments; and output the at least one transcript of the at least one audio recording.

2. The non-transitory computer readable medium of claim 1, wherein the at least one pre-transcription evaluation parameter is at least one of: i) language, ii) the audio quality, or iii) the accent.

3. The non-transitory computer readable medium of claim 2, wherein a respective set of transcription decisions comprises at least one of: i) a pre-transcription importance ranking of a plurality of pre-transcription evaluation parameters, or ii) a post-transcription importance ranking of a plurality of post-transcription evaluation parameters.

4. The non-transitory computer readable medium of claim 1, wherein the at least one post-transcription evaluation parameter is a confidence threshold.

5. The non-transitory computer readable medium of claim 1, wherein each segment of the plurality of audio segments lasts between 5 and 15 seconds.

6. The non-transitory computer readable medium of claim 1, wherein the at least one audio recording is real-time streamed audio of the at least one speech of the at least one person.

7. The non-transitory computer readable medium of claim 1, wherein the at least one audio recording comprises at least two speeches of at least two people; wherein the generating the at least one transcript of the at least one audio recording further comprises: generating a first transcript of a first speech of a first person, and generating a second transcript of a second speech of a second person; and wherein the outputting the at least one transcript of the at least one audio recording further comprises: outputting the first transcript of the first speech of the first person, and outputting the second transcript of the second speech of the second person.

8. The non-transitory computer readable medium of claim 7, wherein the at least two speeches are in distinct languages.

9. The non-transitory computer readable medium of claim 1, wherein the respective distinct speech recognition model is at least one of: i) a phoneme-based acoustic Gaussian mixture model, ii) a phoneme-based acoustic hidden Markov model, iii) a phoneme-based acoustic neural net model trained from forced phonetic alignments, iv) a phoneme-based acoustic neural net model trained without forced phonetic alignments, v) a character-based acoustic neural net model, vi) any of i-v models coupled with an n-gram language model, or vii) any of i-v models coupled with a generative, neural net language model.

10. The non-transitory computer readable medium of claim 1 further comprising instructions that direct the processor to: test each distinct speech-to-text transcription engine of the plurality of distinct speech-to-text transcription engines based on the at least one benchmark set to form a plurality of model result sets.

11. The non-transitory computer readable medium of claim 10 wherein each model result set corresponds to a respective distinct speech-to-text transcription engine.

12. The non-transitory computer readable medium of claim 11 wherein each model result set comprises:

i) the at least one benchmark set, ii) at least one model-specific training hypothesis for each training audio segment, iii) at least one confidence value associated with the at least one model-specific training hypothesis, and iv) at least one word error rate (WER) associated with the at least one model-specific training hypothesis.

13. The non-transitory computer readable medium of claim 12 further comprising instructions that direct the processor to:

determine a respective set of transcription decisions for each distinct speech-to-text transcription engine of the plurality of distinct speech-to-text transcription engines, wherein the respective set of transcription decisions defines, for each distinct speech-to-text transcription engine, the value of the at least one pre-transcription evaluation parameter and the value of the at least one post-transcription evaluation parameter.

14. The non-transitory computer readable medium of claim 13 further comprising instructions that direct the processor to:

combine each respective set of transcription decisions for each distinct speech-to-text transcription engine of the plurality of distinct speech-to-text transcription engines into the at least one speech recognition model specification for the plurality of distinct speech-to-text transcription engines.

15. The non-transitory computer readable medium of claim 10 wherein each model result set comprises:

i) the at least one benchmark set, ii) at least one model-specific training hypothesis for each training audio segment, iii) at least one confidence value associated with the at least one model-specific training hypothesis, and iv) at least one word error rate (WER) associated with the at least one model-specific training hypothesis.

16. The non-transitory computer readable medium of claim 15 further comprising instructions that direct the processor to:

determine a respective set of transcription decisions for each distinct speech-to-text transcription engine of the plurality of distinct speech-to-text transcription engines, wherein the respective set of transcription decisions defines, for each distinct speech-to-text transcription engine, the value of the at least one pre-transcription evaluation parameter and the value of the at least one post-transcription evaluation parameter.

17. The non-transitory computer readable medium of claim 16 further comprising instructions that direct the processor to:

combine each respective set of transcription decisions for each distinct speech-to-text transcription engine of the plurality of distinct speech-to-text transcription engines into the at least one speech recognition model specification for the plurality of distinct speech-to-text transcription engines.

* * * * *